(12) United States Patent
Kooi et al.

(10) Patent No.: US 7,522,068 B2
(45) Date of Patent: Apr. 21, 2009

(54) METHOD AND APPARATUS FOR INDICATING DIRECTION USING A SCREEN, AND VEHICLE EQUIPPED THEREWITH

(75) Inventors: Frank Leonard Kooi, Houten (NL); Alexander Toet, Utrecht (NL); Jacob Jan Kriekaard, Soest (NL)

(73) Assignee: Nederlandse Organisatie voor toegepast-natuurwetenschappelijk Onderzoek TNO, VK Delft (NL)

( * ) Notice: Subject to any disclaimer, the term of this patent is extended or adjusted under 35 U.S.C. 154(b) by 84 days.

(21) Appl. No.: 10/577,904

(22) PCT Filed: Nov. 2, 2004

(86) PCT No.: PCT/NL2004/000767

§ 371 (c)(1),
(2), (4) Date: May 1, 2006

(87) PCT Pub. No.: WO2005/043083

PCT Pub. Date: May 12, 2005

(65) Prior Publication Data

US 2007/0120709 A1    May 31, 2007

(30) Foreign Application Priority Data

Nov. 3, 2003   (NL) .................................. 1024694

(51) Int. Cl.
*G08G 1/123* (2006.01)

(52) U.S. Cl. ............................ 340/995.14; 340/995.19; 340/995.27; 340/995.28; 701/211

(58) Field of Classification Search ............... 340/995.1, 340/995.14 X, 995.15, 995.19 X, 995.28 X, 340/995.26, 995.27 X; 701/208, 209, 210, 701/211, 224

See application file for complete search history.

(56) References Cited

U.S. PATENT DOCUMENTS

| 3,258,743 | A |   | 6/1966 | Schuster |
| 4,463,355 | A |   | 7/1984 | Schultz et al. |
| 4,868,719 | A | * | 9/1989 | Kouchi et al. ............... 362/545 |
| 5,113,185 | A | * | 5/1992 | Ichikawa ............... 340/995.27 |
| 5,890,089 | A |   | 3/1999 | Ogino et al. |

FOREIGN PATENT DOCUMENTS

| EP | 0 370 640 A2 | 5/1990 |
| EP | 0 489 521 A2 | 6/1992 |
| JP | 08219802     | 8/1996 |
| JP | 09159480     | 6/1997 |

* cited by examiner

*Primary Examiner*—Brent Swarthout
(74) *Attorney, Agent, or Firm*—Hoffmann & Baron, LLP (57) ABSTRACT

The invention relates to a method for indicating direction using a screen, wherein a pattern of relatively dark and relatively bright sections is moved over a screen, in a direction in which an observer is to be directed. The invention further relates to an apparatus for indicating information on a screen, comprising at least one screen and image information-generating means, wherein the image information-generating means comprise at least one algorithm for displaying, on said screen, at least one first image in the form of a moving pattern of first and second sections, wherein the first sections are relatively bright compared to the second sections, wherein the screen has longitudinal edges and said image information-generating means are preferably arranged for at least temporarily moving said pattern in the direction of at least one of the longitudinal edges.

6 Claims, 8 Drawing Sheets

Fig. 7

METHOD AND APPARATUS FOR INDICATING DIRECTION USING A SCREEN, AND VEHICLE EQUIPPED THEREWITH

This application is the U.S. National Phase of, and Applicants claim priority from, International Application Number PCT/NL2004/000767 filed 2 Nov. 2004, and Netherlands Application NL 1024694 filed 3 Nov. 2003, both of which are incorporated herein by reference.

The invention relates to a method for indicating direction using a screen. The invention further relates to an apparatus suitable for this purpose and a vehicle provided with such an apparatus.

From practice, it is known to use a screen for indicating direction, for instance in a navigation system for a vehicle such as an automobile. An example of such a system is Carin®, a navigation system of Philips, the Netherlands. On the basis of GPS, the position of a vehicle is determined and via an interface a desired destination of the vehicle can be entered. The navigation system then chooses a route between the determined position and the desired position. During the drive, this route is shown via the screen in bright color animations.

In these known systems, the screen information is relatively detailed and one needs to look directly at the screen in order to be able to observe the information presented. This is not favorable to safety. In addition, the information presented is relatively static in that the image replacement does not take place continuously but periodically. Depending on a set accuracy and scale, the information presented will therefore be relatively late or at least have a visually low accuracy.

In order to obviate this disadvantage, it is known to support the visual information by spoken information. Here, route information is presented using speech generation. Examples of this information may, for instance, be: "after three hundred meters keep left" or "after two hundred meters take the first turn on the roundabout". In this manner, relevant information is presented without the driver needing to take his or her eyes off the road to look at a screen. In addition, this information can be given relatively early. A disadvantage of the speech support is that it can be lost in background noise such as vehicle noise, speech and music in the vehicle and the like. In addition, such spoken information can be unclear and cause irritation of the driver.

It is further known to present direction information on a screen using, for instance, arrows and similar animations. For instance, with payment terminals, screens are used where, with the aid of arrows, buttons are indicated which must/can be pressed for a particular desired action. These are difficult to recognize particularly for visually impaired people.

JP 09159480 describes a navigation system for a vehicle, where, on a roadmap, the road to be traveled is depicted in the form of a line built up from dark and bright sections which moves over the representation of this road to be traveled and, as a whole, moves along with the roadmap. So, this line often includes bends, so that the sections from which the line is built up move in different directions.

The invention contemplates a method for presenting direction information using a screen, where the disadvantages mentioned are at least partly avoided.

The invention particularly contemplates providing a method which is applicable with or as a navigation system, for instance for vehicles, whereby the ease of use and/or the safety is increased compared to existing navigation systems.

The invention further contemplates providing a method of the type described in the introduction with which the ease of use of apparatuses provided with screens is increased.

The invention more particularly contemplates providing such a method where information is presented on a screen, visible and clear to a driver of a vehicle or another user of an apparatus without this screen being looked at directly.

The invention further contemplates providing an apparatus for presenting direction information on, at least using a screen and a vehicle provided with such an apparatus.

At least a number of these and further objects are achieved with a method or apparatus according to the invention.

SUMMARY OF THE INVENTION

In a method according to the invention, a pattern of relatively dark and relatively bright sections is moved over a screen, in a direction in which an observer is to be directed.

It has been found that a moving pattern of sections which are relatively dark and bright relative to each other on a screen is well visible and informative to observers such as for instance drivers of vehicles, particularly also in a peripheral visual field. In addition, it has been found that such patterns are excellently suitable for giving simple instructions, which can be presented instead of or, preferably, additionally to other visual information. Thus, at least a part of the desired direction information can be presented to, for instance, a driver of a vehicle without him or her needing to take the eyes off the road. In addition, such patterns can simply be used for, for instance, visually impaired people, because, surprisingly, their peripheral visual field is often found to be still sensitive to such moving patterns, while the central visual field is virtually eliminated.

In this context, an observer is understood to mean an intended user of the information presented. In this context, indicating direction is at least understood to mean information with respect to a desired direction of movement of, for instance, a vehicle, but also a desired direction of attention and/or action, such as for instance instructions on a screen of a payment terminal or the like, for control buttons and the like. This is explicitly understood to include information which can be used in that context, for instance attention information such as moving patterns with which precisely the attention of an observer can be drawn, for instance prior to the presentation of the actual information.

In this context, a moving pattern is at least understood to mean an image on a screen which visually appears to undergo a movement in a direction of, for instance, a longitudinal edge of the screen, preferably relatively fluently.

In a method according to the invention, preferably, a pattern of alternately relatively dark and bright sections is used, particularly stripes.

In a particularly advantageous embodiment, this pattern is presented on a screen, next to or as background of a second image which is relatively static with respect to the pattern. For instance, this pattern can be displayed as background in a screen of an existing navigation system as the second image, or as support in a screen of, for instance, a telephone display, an ATM, a computer screen or the like.

In a particularly advantageous embodiment, a method according to the invention is used in a method for presenting route information in a vehicle, characterized by the measures according to claim 5.

In such a method, a screen of a navigation system is placed in a vehicle such as a car, preferably such that it is located in a peripheral visual field of a driver of this vehicle if the driver is looking straight ahead. On the screen, in a usual manner, visual route information is given, for instance by animation, optionally speech-supported. On the same screen, in the above-described manner, a moving pattern of sections is presented, preferably only when extra attention of the driver is needed, for instance in case of a turn to be taken, route and/or traffic information and the like and/or prior to presenting such information.

Because the pattern is presented, the attention of the driver can safely be drawn and relatively simple information can be conveyed without the need to look at the screen and/or to listen to the spoken information for this purpose. Especially if the screen is placed in a peripheral visual field, the safety is thus considerably increased.

Preferably, the pattern is presented in a brightness and/or contrast lower than that of the topographical image and/or graphical representation of a route, in particular a contrast and/or brightness of 50% or less than that of the topographical image and/or graphical representation of a route. It has been found that less than 20% of the contrast thereof is already sufficient to be able to convey the desired information in a peripheral visual field.

For uses for visually impaired people, preferably a higher contrast is used, for instance equal to that of a second, more static image.

It is preferred that the pattern is presented in grays, at least as substantially monochrome sections, lines and the like. It is particularly advantageous when the route information or similar second image is presented in color, since this yields an attractive image with which, for instance, a high information density and great clarity can be achieved.

With a pattern according to the invention, at least due to the structure and/or the movement speed and/or modulation frequency and/or direction and/or composition of the pattern, information can be presented, for instance directed on the basis of the attention desired of the driver and/or an action to be performed by the driver. Preferably, use is made of at least structure as direction of movement.

The invention further relates to an apparatus for indicating information on a screen, characterized by the measures according to claim 11.

With such an apparatus, in a simple and safe manner, information can be presented using a screen, particularly also in those situations when directly looking at the screen is undesired or, conversely, the driver's attention needs to be drawn and/or if a user is visually impaired.

Preferably, an apparatus according to the invention further comprises image information-generating means for presenting further information on the screen, in the form of a second image, next to or through the image formed by the pattern. This is at least understood to mean presenting two images which are visible and interpretable both in combination and individually.

The invention further relates to a vehicle provided with an apparatus according to the invention.

BRIEF DESCRIPTIONS OF THE DRAWING

In the subclaims, further advantageous embodiments of a method, apparatus and vehicle according to the invention are shown. To clarify the invention, exemplary embodiments thereof will be further elucidated with reference to the drawing, in which:

DETAILED DESCRIPTION OF THE INVENTION

In this description, same or corresponding parts have same or corresponding reference numerals. By way of illustration, FIGS. 1-5 show a method and apparatus according to the invention in a car as vehicle. FIG. 6 shows an ATM as an example. However, the embodiments and uses shown are by no means to be taken as being limitative.

Figure 1:
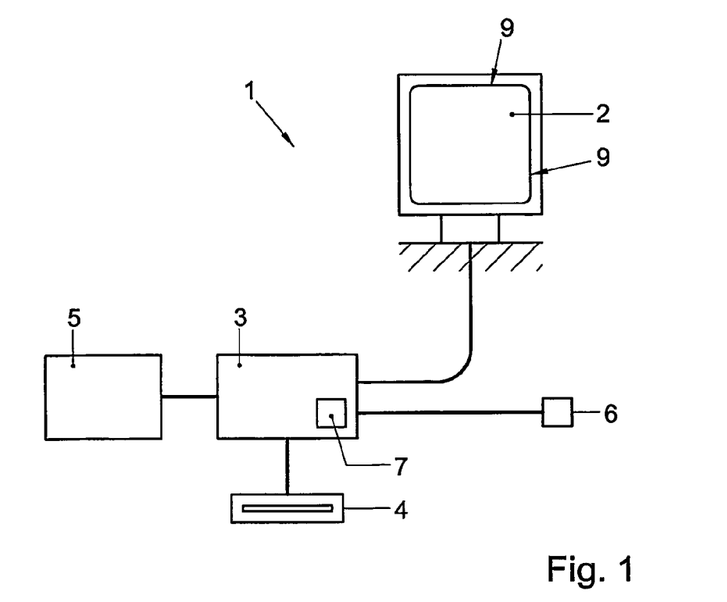
FIG. 1 diagrammatically shows an apparatus according to the invention.

FIG. 1 shows an apparatus 1 according to the invention, for use of a method according to the invention. This apparatus 1 comprises a screen 2, image information-generating means such as a calculation unit 3 with means for storing and providing image information coupled thereto, such as a CD or DVD player 4. Further, control means 5 are provided, for instance a keyboard, remote control, steering wheel control or the like. Such an apparatus is known per se as navigation system for, for instance, use in a car, boat, airplane or the like. To the image information-generating means 3, preferably a GPS receiver 6 or similar position determining apparatus is coupled so that the position of the apparatus can be determined at all times and be displayed on the screen 2.

Figure 7:
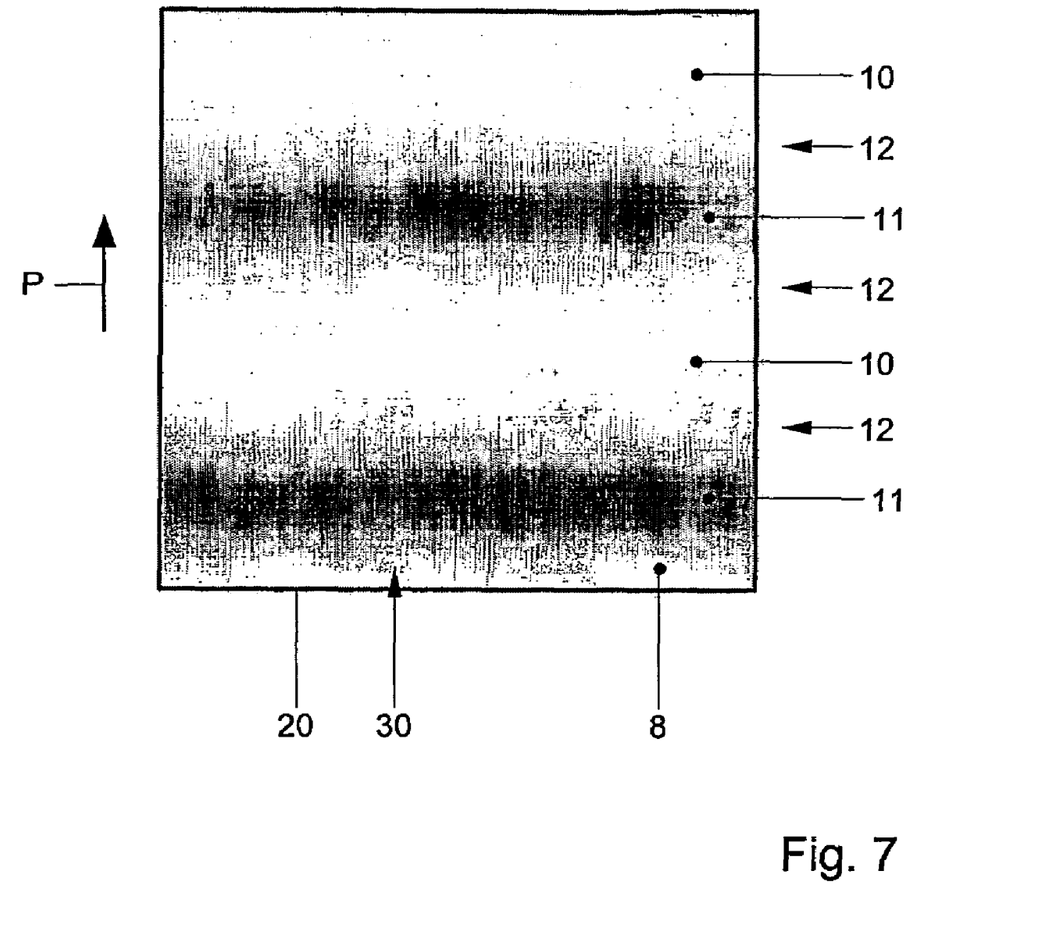
FIG. 7 shows an image configuration for use with a method according to the invention.

In an apparatus 1 according to the invention, in the image information-generating means 3, a module 7 is added or coupled, which module is provided with at least one algorithm, arranged for displaying a first, substantially dynamic image 8 on a screen, for instance as shown in FIG. 7. Such a first image 8 consists of, for instance, a pattern 30 which moves in the direction of a longitudinal edge 9 of the screen 2 or makes reciprocal movements. More generally, thus, a dynamic first image 8 can be generated which gives the impression that it rotates and/or translates over the screen 2 and/or varies in light intensity or contrast and/or structure for suggesting movement.

In the exemplary embodiment shown, the first image 8 is built up of sections which are relatively bright and dark relative to each other. FIG. 7 shows, for instance, a first image 8 which alternately comprises first, relatively bright sections 10 and second, relatively dark sections 11, between which a transitional section 12 is provided in which the tone changes from the relatively dark sections 11 to the relatively bright sections 10 and vice versa. Stripes are shown, but of course a fluent transition can be used or different types of sections, for instance blocks, circles and the like. In FIG. 7, the image 8, at least the pattern 30, runs in the direction P from the bottom to the top in the drawing, in the direction of the upper longitudinal edge. Herein, movement is, for instance, to be understood to mean that the stripes 10, 11 (seem to) move upward. It is clear that these movements can take place in several individual or combined directions. The suggestion of movement can of course also be generated, at least enhanced, by switching parts of the first image 8 on and off.

Figure 3:
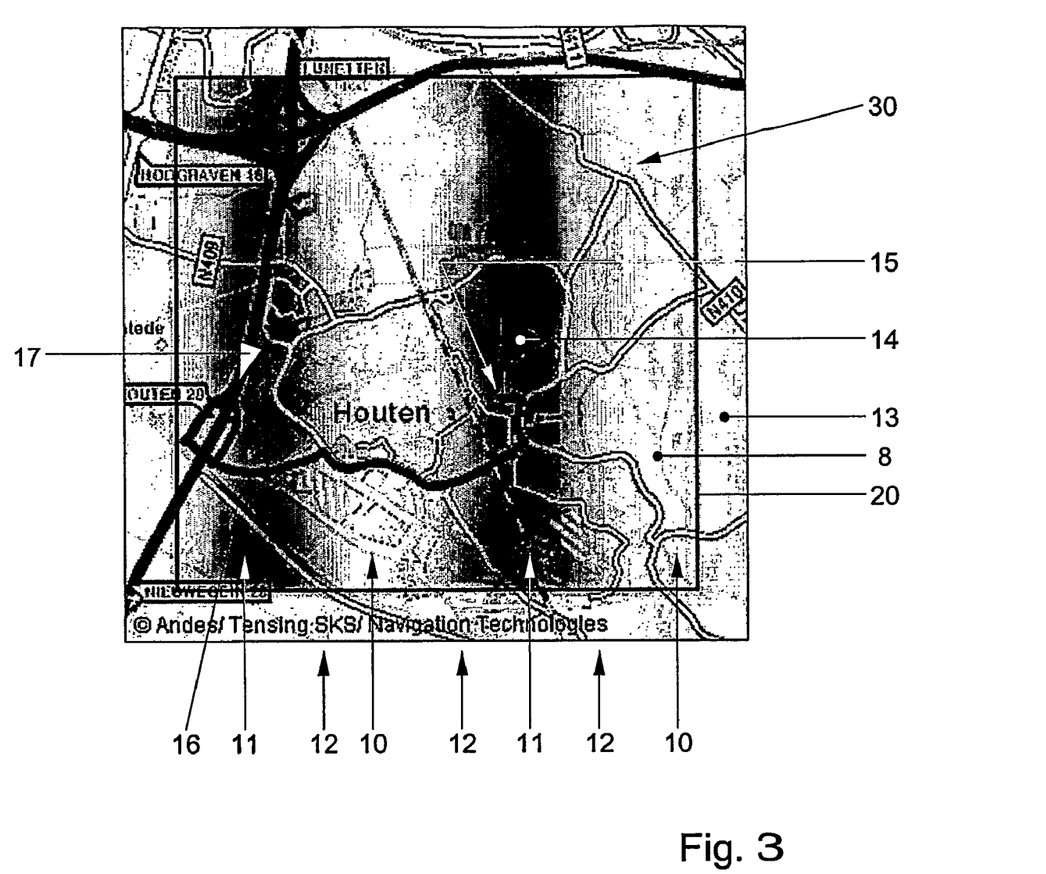
FIG. 3 diagrammatically shows an image on a screen of an apparatus according to the invention, in a first embodiment.

As FIG. 3 shows, on the screen 2, the first image 8 can be displayed together with a second image 13, in the example shown a roadmap of a navigation system. On this first image, mainly relatively dark sections 11 are visible over the second image 13. The second image 13 shows a part of a road system in which a flag 14 indicates the destination 15 entered by the user using the control means 5, as well as a route 16 to this from a starting point (not shown). Using a symbol such as an arrow 17, it is indicated where the vehicle 18 in which the apparatus 1, particularly the navigation system, is included is located. To illustrate the embodiment shown, in FIG. 3, the first image is provided with a frame 20. This can be left out in practice.

Figure 2:
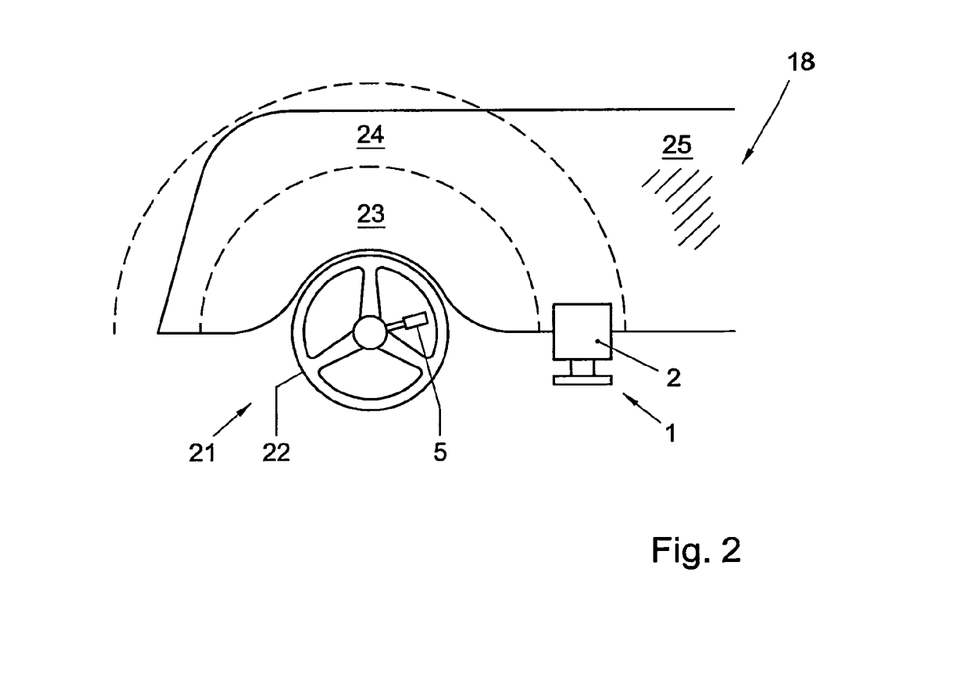
FIG. 2 diagrammatically shows the arrangement of an apparatus according to the invention in a vehicle.

FIG. 2 shows the arrangement of the screen 2 in a vehicle 18. FIG. 2 shows, from the driver position 21 behind a wheel 22, the primary 23 and secondary visual field 24 of the driver when he or she looks straight ahead through the windscreen 25. The screen 2 has been arranged outside the primary visual field 23, in the secondary visual field 24. It has been found that use of a first image 8 on a thus arranged screen 2 is well visible to the driver, at least has a high attention value, without the driver needing to look directly at the screen 2. So, he or she can keep his or her eyes "on the road". Control means 5 can be provided in a usual manner, for instance on the steering wheel 22.

Figure 5A:
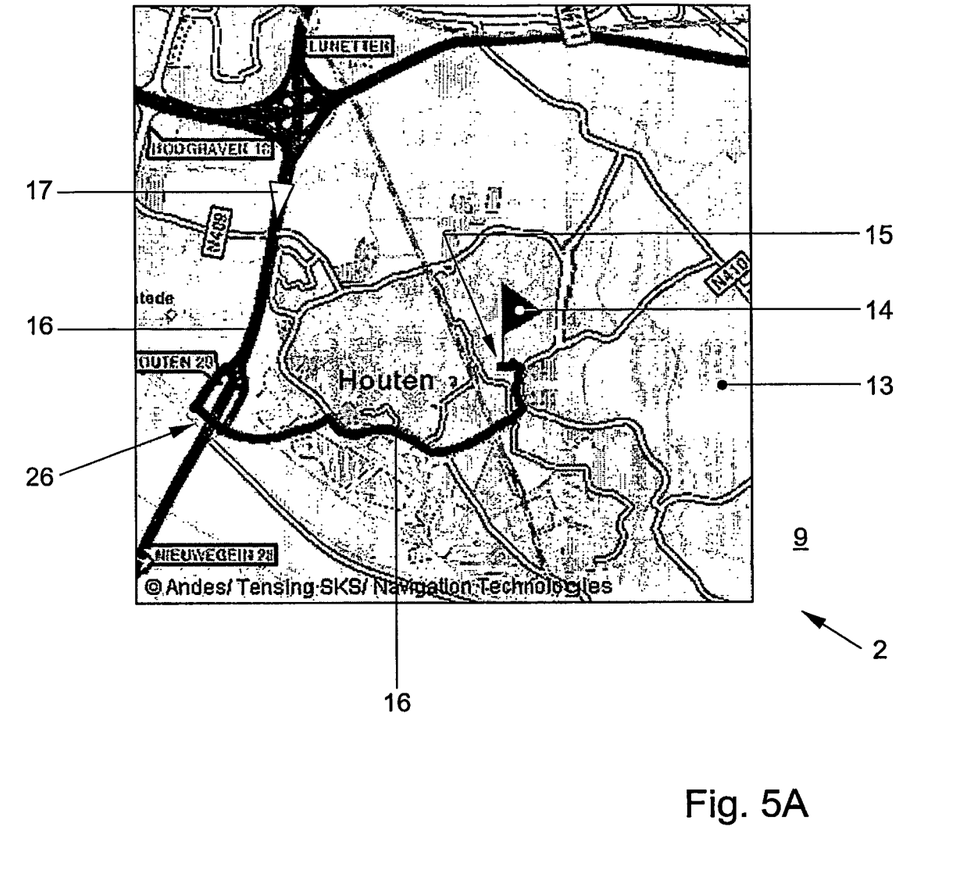
FIGS. 5A-C show a series of successive image configurations, for drawing attention to an approaching change of direction and a subsequent indication of this change of direction.
Figure 5B:
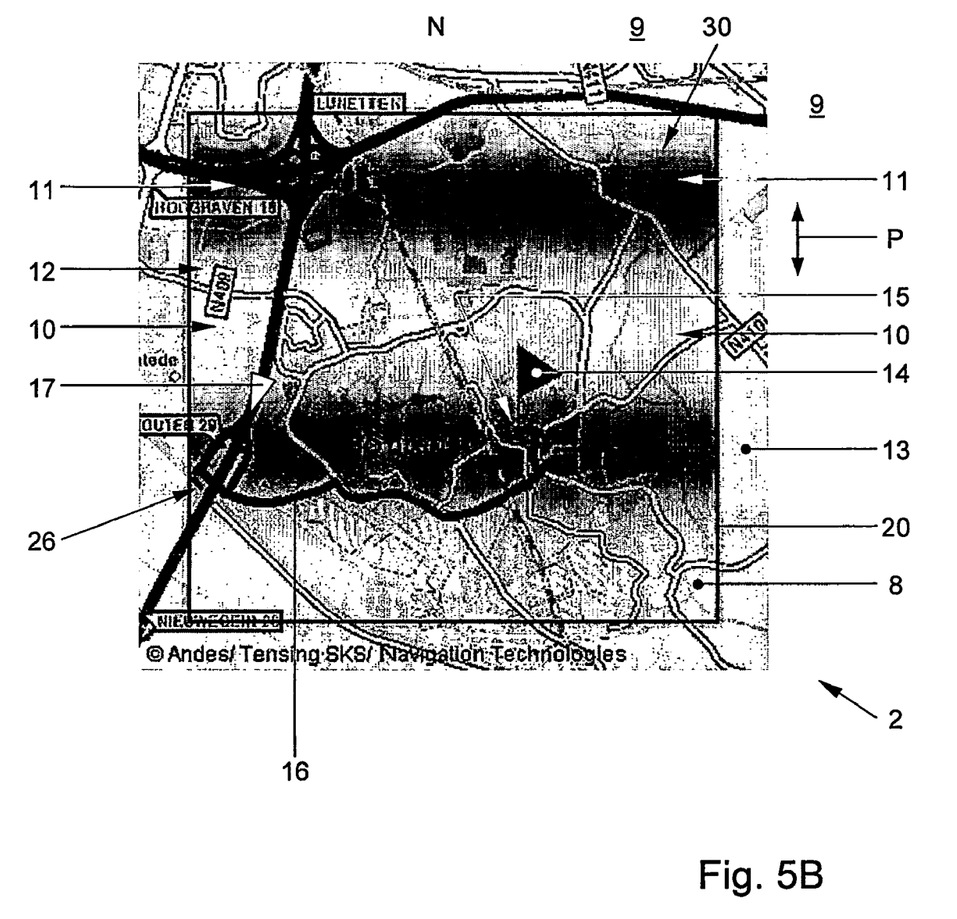
Figure 5C:
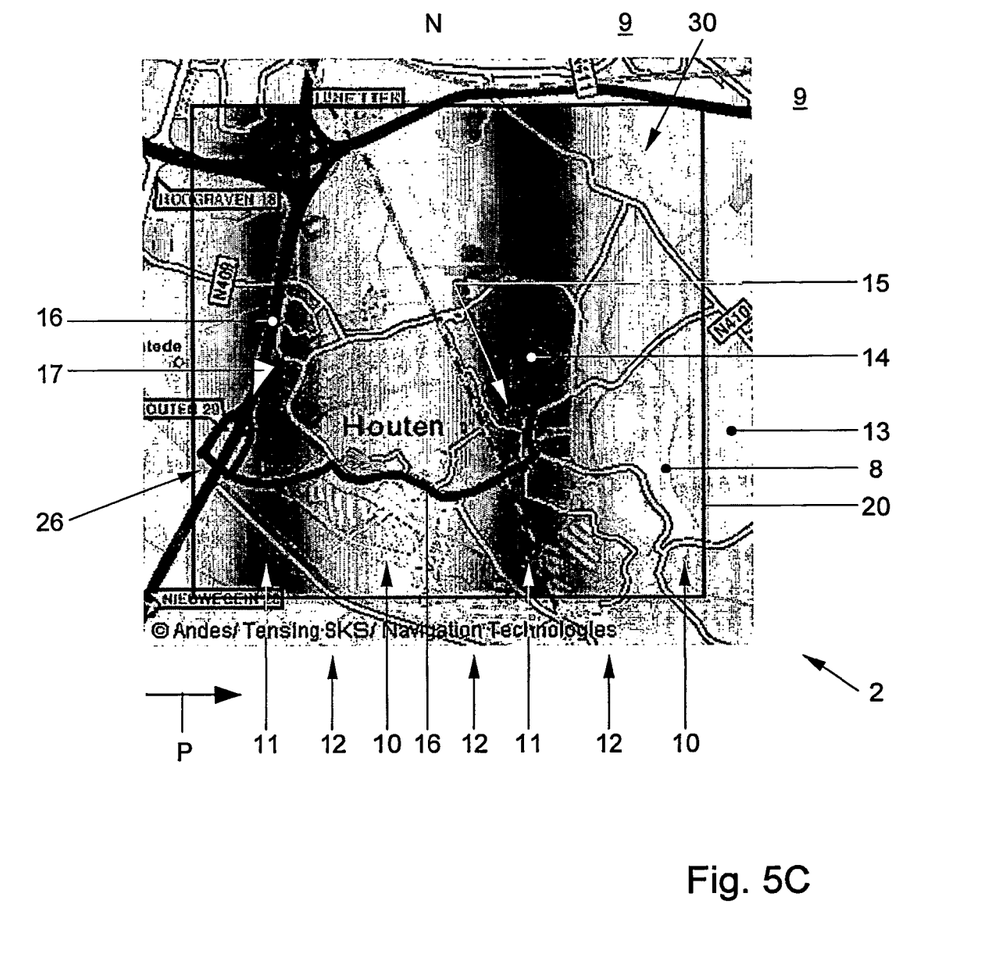
Figure 6:
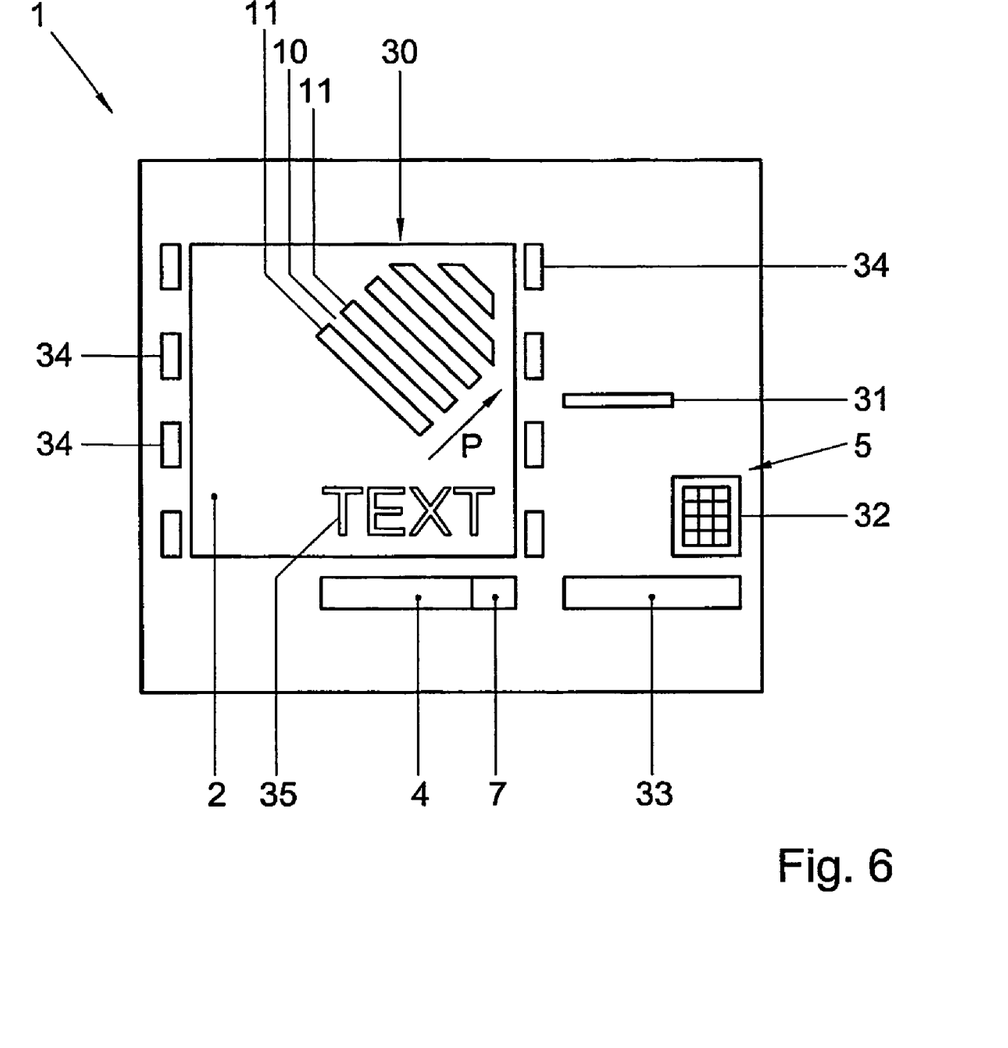
FIG. 6 shows an alternative use of the invention.

FIGS. 5A-C show three images of a screen 2 of a vehicle 1 according to the invention, in three successive positions of the vehicle 18.

In FIG. 5A the vehicle 18 is (see arrow 17) on a relatively straight part of the road. Here, the second image 13 completely visible and no or a completely transparent first image 8 is displayed. The driver then knows that he simply has to follow the road.

In FIG. 5B, over the second image 13, a first image 8 is displayed, with a pattern 30 of sections 10, 11, 12 running up and/or down. As is clearly shown, the vehicle 18 (arrow 17) approaches a turn 26 (exit "Houten 29"), which turn 26 the vehicle should take. By the pattern 30 moving up and/or down and/or flashing and/or accelerating and/or decelerating and/or changing in composition, the attention of the driver is fixed thereon without the eyes being focused on the screen ("out of the corner of the eye"). For instance, the movement speed can be increased or the image intensified, or, preferably, the modulation frequency can be adjusted, particularly increased, if the respective turn 26 is more closely approached, in order to increase the attention value for the driver.

FIG. 5C shows that the vehicle 18 (arrow 17) has arrived at the respective turn 26. Here, over the relatively static second image 13, a first image 8 is shown with a pattern 30 of sections 10, 11, 12 running from left to right. It is thereby indicated to the driver, as support of the second image 13, that this turn 26 is to be taken, for which purpose the highway is to be left on the right (viewed in the driving direction of the vehicle 18) in order reach the entered destination 15. This pattern 30 may, for instance, be deployed right before the turn 26 is reached. Optionally, the pattern 30 as shown in FIG. 5B can be changed to the pattern as shown in FIG. 5C by rotation on the screen 2, for instance with an image 8 in the form of a wheel with spokes.

It has been found particularly advantageous to control the screen 2, at least the first image 8, with a varying modulation frequency. Here, the modulation frequency is increased as a higher attention of the user to the route information is desired. In this context, modulation frequency is at least understood to mean the frequency with which the image is modulated, for instance the frequency with which the (first) image is refreshed. For instance, when driving over a road part without turns and the like, comparable with FIG. 5A, the image can slide over the second image 13 in a fluent movement. If a turn 26 is more closely approached, as shown in FIG. 5B, the modulation frequency will be adjusted, so that the first image 8 will move over the second image 13 in a jolting manner.

Preferably, it does remain visible all the time since this has been found to be more restful to a user. When the respective turn 26 has (virtually) been reached, as shown in FIG. 5C, the modulation frequency will be further adjusted, so that the first image 8 will move over the second image 13 in a slightly jolting manner.

Here as well, the first image 8 preferably does remain visible at all times.

So, here, the first image 8 moves "step by step" over the second image, for instance up and then to the right as described hereinabove, while the modulation frequency can be used as measure for the desired attention.

Here, the first image can alternately stand still and move and/or alternately be switched on and off.

Of course, acoustic and/or optical aids can be added. For instance, an attention light on the dashboard of the vehicle or in the screen can be provided whose flashing frequency is increased as a turn is approached more closely.

In order to support the attention value, in addition to or instead of the pattern 30, as shown, for instance in FIG. 5B, the brightness of the screen 2 can temporarily be adjusted if increased attention is necessary. The movements of the pattern 30 of the first image 8 can be both fluent and intermittent, "jerking".

It will be clear that, by choice of different patterns, different messages can be conveyed to an observer such as a driver of a vehicle. For instance, the direction P of movement can be chosen depending on the desired vehicle direction, desired accelerations and decelerations and the like, by coding of the patterns more or less complex messages can be conveyed, comparable with codes such as Morse code and, also, multiple first images 8 can be displayed, for instance with movements in different directions. Moreover, in addition to the first images, other, already known support means can of course be used as well, such as voice instructions, which are, for instance, adjustable, so that they are always on or are always off or are only switched on if a "complex" traffic situation occurs, such as a roundabout.

Figure 4:
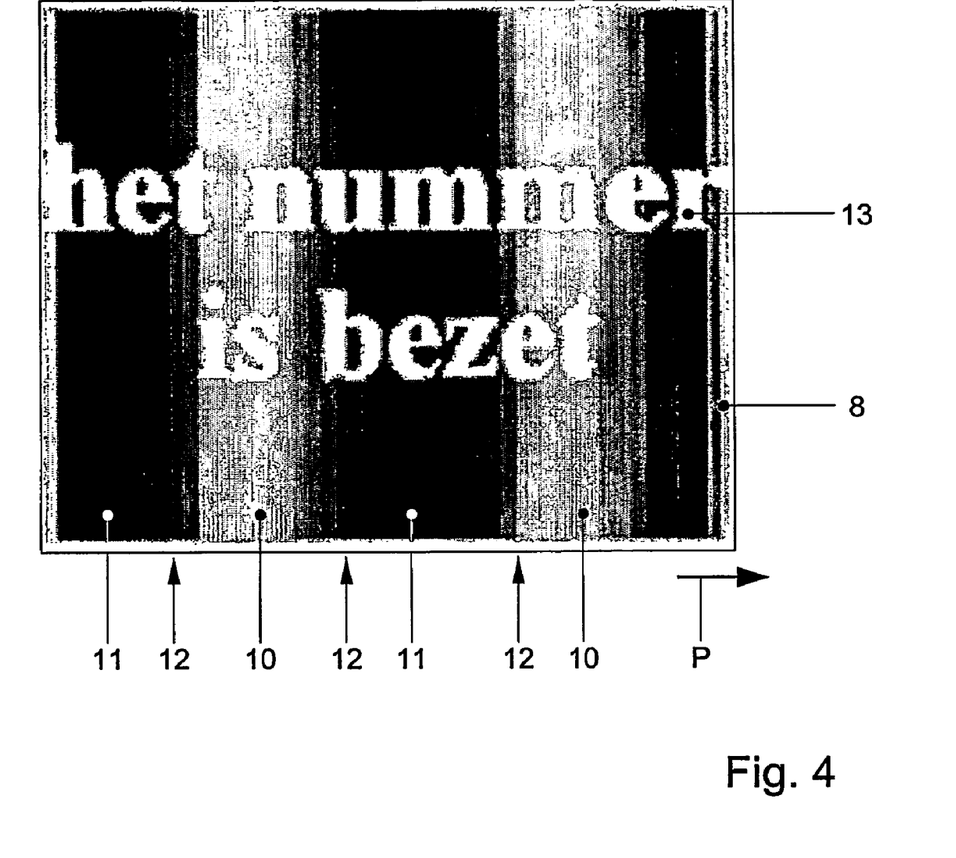
FIG. 4 diagrammatically shows an image on a screen of an apparatus according to the invention, in a second embodiment.

FIG. 4 shows an alternative embodiment of an apparatus according to the invention, where, on a telephone screen, a first, dynamic image 8 in the form of a moving pattern 30 is shown, again in relatively dark and bright sections 10, 11 and transitional sections 12, with which the attention of a driver can be drawn in a different position in the vehicle, for instance to support a navigation system. In the embodiment shown, the pattern may also be used to draw the driver's attention to a change in the second image 13, for instance if the chosen number is no longer engaged ("the number is engaged" changes into "dials") so that this is simply pointed out to the driver.

FIG. 6 shows an alternative embodiment of an apparatus 1 according to the invention in the form of an ATM. This comprises the usual parts such as a credit card slot 31, a keyboard 32, a money slot 33 and a screen 2 with control buttons 34 arranged around it. After inserting a credit card (bank card) and entering an identification code on the keyboard 33, the communication continues via the screen and the control buttons. With the aid of written text 35, on the screen, information is given about control buttons 34 which are or are not to be pressed sequentially and optionally for performing a desired action. It has been found that, particularly for visually impaired people, such instructions are not readable or difficult to read. Also, unfavorable lighting conditions can make this difficult for others.

By using a method according to the invention, the use of such an apparatus 1 can considerably be improved. Here, instead or, preferably, in addition to the text 35, with a module 7 of an image information-generating means 3, a pattern 30 of moving sections 10, 11 is presented on the screen 2, which for instance moves in the direction P of a control button 34 which is the next which must or can be operated. Here, the pattern can display further information, for instance in the form of a code, such as for instance a choice between two control buttons and the functions thereof. It has been found that such patterns are even visible to visually impaired people in particular, particularly if they use their peripheral visual field which is particularly sensitive to grays, in particular the color-insensitive rods in the eye, for this. This can considerably increase the ease of use of such an apparatus 1.

In the exemplary embodiments shown, the bright and dark sections 10, 11, 12 are displayed relatively brightly, with high contrast, for reasons of clarity. It has been found, however, that this contrast can be chosen so as to be relatively low, for instance a contrast which is more than 50% lower than that of the second image 13. Preferably, a contrast is used of less than 25%, more in particular less than 20%. For the second image 13, colors can be used, while the first image 8 is preferably built up in grays. In this specification, contrast and relatively dark and bright are at least understood to mean a difference in gray values of grays and/or colors.

It is clear that the first image 8 is presented independently of the second image 13 with respect to form. Thus, with the embodiments according to FIGS. 1-5, the form of the first image 8 differs from that of the route to be traveled optionally presented in the second image 13 and the images do not move dependently of each other. In the embodiment shown in FIG. 6, the form of the first image is different than that of the information on the second image. The bright and dark sections are wholly or partly transparent, so that the second image remains at least partly visible under these sections.

The invention is by no means limited to the examples given in the description and drawings. Many variations thereof are possible within the framework of the invention set forth in the claims.

For instance, other means may be used for building up the second image, for instance via Internet or intranet connections, while, in addition, information may be presented in a different manner via the second image. The first and second image may be presented on two different screens, for instance the first image on a first screen such as a telephone or board computer screen and the second image on the screen of a navigation system. Further, an apparatus according to the invention may of course be used in other vehicles and in other applications with screens, for instance in networks and the like.

The invention claimed is:

1. A method for presenting route information in a vehicle, wherein a screen of a route information system such as a navigation system is arranged in said vehicle, preferably in a peripheral visual field of a driver of the vehicle, wherein, on said screen, at least one of a topographical image and graphical representation of a route is presented, wherein, simultaneously, a pattern of relatively dark and relatively bright sections is moved over said screen in a direction P which is recommended to the driver of the vehicle, said pattern presented with a contrast which is lower than the contrast of at least one of said topographical image and graphical representation of said route.

2. The method according to claim 1, wherein the contrast of said pattern is less than 50% of the contrast of at least one of said topographical image and graphical representation of said route, preferably less than 25%, more particularly less than 20%.

3. A method for presenting route information in a vehicle, wherein a screen of a route information system such as a navigation system is arranged in said vehicle, preferably in a peripheral visual field of a driver of the vehicle, wherein, on said screen, at least one of a topographical image and graphical representation of a route is presented, wherein, simultaneously, a pattern of relatively dark and relatively bright sections is moved over said screen in a direction P which is recommended to the driver of the vehicle, wherein said pattern is presented in grays and at least one of said topographical image and graphical representation of said route is presented in color.

4. An apparatus for indicating information on a screen, comprising at least one screen and image information-generating means, wherein the image information-generating means at least comprise an algorithm for displaying, on said screen, at least a first image in the form of a moving pattern of first and second sections, wherein the first sections are relatively bright compared to the second sections, wherein the screen has longitudinal edges and said image information-generating means are preferably arranged for at least temporarily moving said pattern in the direction of at least one of the longitudinal edges, wherein the image information-generating means are further arranged for displaying, on said screen, further information in the form of a second image, over said first image, wherein the contrast of said first image is lower than the contrast of said second image, in particular more than 50% lower, more in particular more than 75% lower and preferably more than 80% lower.

5. An apparatus for indicating information on a screen, comprising at least one screen and image information-generating means, wherein the image information-generating means at least comprise an algorithm for displaying, on said screen, at least a first image in the form of a moving pattern of first and second sections, wherein the first sections are relatively bright compared to the second sections, wherein the screen has longitudinal edges and said image information-generating means are preferably arranged for at least temporarily moving said pattern in the direction of at least one of the longitudinal edges, wherein the image information-generating means are further arranged for displaying, on said screen, further information in the form of a second image, over said first image, wherein the contrast of the first image is adjustable independently of the second image.

6. An apparatus for indicating information on a screen, comprising at least one screen and image information-generating means, wherein the image information-generating means at least comprise an algorithm for displaying, on said screen, at least a first image in the form of a moving pattern of first and second sections, wherein the first sections are relatively bright compared to the second sections, wherein the screen has longitudinal edges and said image information-generating means are preferably arranged for at least temporarily moving said pattern in the direction of at least one of the longitudinal edges, wherein the first image is displayed in grays, at least is built up from substantially monochrome sections.

* * * * *